US008727005B1

(12) United States Patent
Gamage et al.

(10) Patent No.: US 8,727,005 B1
(45) Date of Patent: May 20, 2014

(54) WELLBORE SERVICING COMPOSITIONS AND METHODS OF MAKING AND USING SAME

(71) Applicant: Halliburton Energy Services, Inc., Houston, TX (US)

(72) Inventors: Pubudu Hasanka Gamage, Katy, TX (US); Jay Paul Deville, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/664,259

(22) Filed: Oct. 30, 2012

(51) Int. Cl.
*E21B 43/22* (2006.01)
*C09K 8/36* (2006.01)

(52) U.S. Cl.
USPC ........................................ 166/308.4; 507/138

(58) Field of Classification Search
None
See application file for complete search history.

(56) References Cited

U.S. PATENT DOCUMENTS

| | | | | |
|---|---|---|---|---|
| 4,506,051 | A * | 3/1985 | Rance | 524/233 |
| 5,252,554 | A | 10/1993 | Mueller et al. | |
| 6,620,770 | B1 * | 9/2003 | Kirsner et al. | 507/131 |
| 7,008,907 | B2 | 3/2006 | Kirsner et al. | |
| 7,271,132 | B2 | 9/2007 | Miller | |
| 7,432,230 | B2 | 10/2008 | Miller | |
| 7,534,746 | B2 | 5/2009 | Miller | |
| 7,803,743 | B2 | 9/2010 | Jones et al. | |
| 7,939,470 | B1 | 5/2011 | Wagle et al. | |

FOREIGN PATENT DOCUMENTS

| | | | | |
|---|---|---|---|---|
| EP | 0920484 | * | 7/1997 | |
| EP | 0920484 | * | 7/2004 | ............... C09K 7/06 |
| WO | 03038008 A1 | | 5/2003 | |

OTHER PUBLICATIONS

Halliburton brochure entitled "Baroid Alkane™, Base Fluid," Baroid, Mar. 25, 2010, 1 page, Halliburton.
Halliburton brochure entitled "EZ Mule® NT, Emulsifier," Baroid, Mar. 26, 2010, 1 page, Halliburton.
Halliburton brochure entitled "Le Supermul™, Emulsifier," Baroid, Mar. 26, 2010, 1 page, Halliburton.
Halliburton brochure entitled "XP-07™, Base Fluid," Baroid, Mar. 26, 2010, 1 page, Halliburton.
Sigma-Aldrich Material Safety Data Sheet entitled "Amyl alcohol," Jan. 19, 2012, pp. 1-7, Sigma-Aldrich Corporation.
Sigma-Aldrich Material Safety Data Sheet entitled "Diethylene glycol butyl ether," Jan. 19, 2012, pp. 1-6, Sigma-Aldrich Corporation.

(Continued)

*Primary Examiner* — James J Seidleck
*Assistant Examiner* — Kumar Bhushan
(74) *Attorney, Agent, or Firm* — Craig Roddy; Conley Rose, P.C.

(57) ABSTRACT

A method of servicing a wellbore in a subterranean formation comprising preparing an invert emulsion comprising an aqueous fluid, an oleaginous fluid, and an emulsifier composition (EC), wherein the emulsifier composition comprises an emulsifier, a diluent, and a thinner, wherein the thinner comprises an alcohol, a fatty acid amide, or combinations thereof; and placing the invert emulsion in the wellbore. A method of servicing a wellbore in a subterranean formation comprising flowing a wellbore serving fluid comprising an emulsifier composition (EC) through a portion of a subterranean formation, wherein the EC comprises an emulsifier, a diluent and a thinner and wherein the thinner comprises 2-methyl-1-propanol, 2-methyl-2-butanol, a fatty acid amide, or combinations thereof; contacting the EC with oil in situ within the formation to form an emulsion; and reducing the water-oil interfacial tension and altering the wettability to provide enhanced oil recovery from the formation.

20 Claims, 2 Drawing Sheets

(56) References Cited

OTHER PUBLICATIONS

Sigma-Aldrich Material Safety Data Sheet entitled "Ethylene glycol butyl ether," Jan. 19, 2012, pp. 1-6, Sigma-Aldrich Corporation.

Foreign communication from a related counterpart application—International Search Report and Written Opinion, PCT/US2013/061708, Dec. 18, 2013, 9 pages.

* cited by examiner

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

This disclosure relates to methods of servicing a wellbore. More specifically, it relates to wellbores servicing compositions and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Emulsifier compositions (EC) are routinely employed in wellbore servicing fluids (WSFs) to lower the interfacial tension between oil and water which allows stable emulsions with small drops to be formed. ECs typically comprise an emulsifier and one or more additives which function to modify one or more properties of the compositions. The components of the ECs are subject to evaluation for compliance with various health, safety, and environmental (HSE) guidelines. Thus an ongoing need exists for improved ECs that meet current HSE guidelines.

SUMMARY

Disclosed herein is a method of servicing a wellbore in a subterranean formation comprising preparing an invert emulsion comprising an aqueous fluid, an oleaginous fluid, and an emulsifier composition (EC), wherein the emulsifier composition comprises an emulsifier, a diluent, and a thinner, wherein the thinner comprises an alcohol, a fatty acid amide, or combinations thereof; and placing the invert emulsion in the wellbore.

Also disclosed herein is a method of servicing a wellbore in a subterranean formation comprising flowing a wellbore serving fluid comprising an emulsifier composition (EC) through a portion of a subterranean formation, wherein the EC comprises an emulsifier, a diluent and a thinner and wherein the thinner comprises 2-methyl-1-propanol, 2-methyl-2-butanol, a fatty acid amide, or combinations thereof; contacting the EC with oil in situ within the formation to form an emulsion; and reducing the water-oil interfacial tension and altering the wettability to provide enhanced oil recovery from the formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
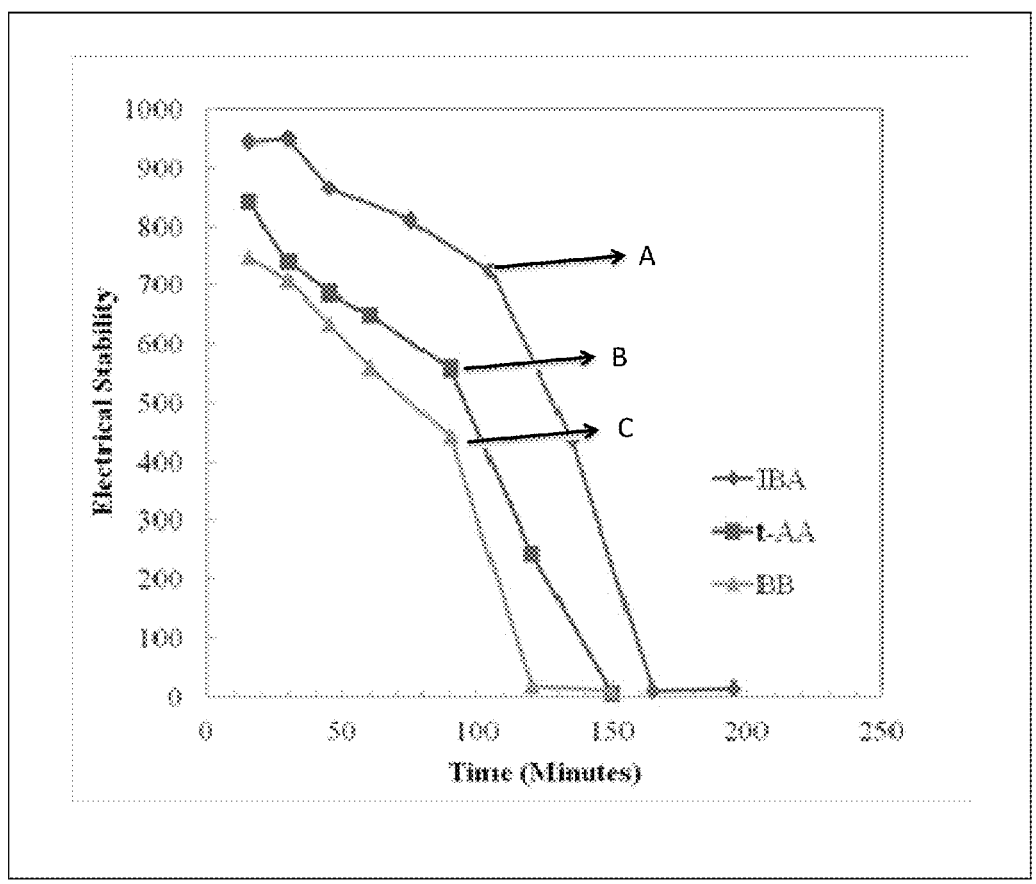
FIGS. 1 and 2 are plots of the electrical stability over time for the samples from Example 2.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are emulsifier compositions (ECs) comprising an emulsifier, a diluent, and a thinner, and wellbore servicing fluids (WSFs) comprising such ECs. In an embodiment, the EC may be used for stabilizing emulsified fluids. In some embodiments, the composition may be used during enhanced oil recovery (EOR) operations. In an embodiment, an EC of the type disclosed herein displays a toxicity level that is sufficiently low to meet one or more HSE guidelines. Each of the components of the EC as well as methods of using same will be described in more detail herein.

In an embodiment, the EC comprises an emulsifier. Without wishing to be limited by theory, an emulsifier is a compound that aids in the forming of an emulsion (i.e., a mixture of two or more liquids that are normally immiscible) by decreasing the interfacial tension between immiscible liquids (e.g., oil and water); or a compound that stabilizes an already existing emulsion by decreasing the separation tendency of the liquids; or both. In an embodiment, the emulsifier comprises a carboxylic acid-terminated polyamide, a mixture produced by a Diels-Alder reaction of dienophiles with a mixture of fatty acids and/or resin acids, or combinations thereof.

In an embodiment, the emulsifier comprises a carboxylic acid-terminated polyamide (CATP). The CATP may be a product of a condensation reaction between a fatty acid and a polyamine. In an embodiment, a condensation reaction between a fatty acid and a polyamine results in a mixture of reaction products that include CATPs. In some embodiments, the mixture of reaction products may be further processed using any suitable methodology to increase the amount of CATPs present. For example, the mixture of reaction products may be subjected to purification and/or separation techniques. Alternatively, the mixture of reaction products may be utilized in the EC without further processing. In an embodiment the amount of CATPs present in the mixture of reaction products is about 90 wt. % based on the total weight of the mixture, alternatively from about 30 wt. % to about 100 wt. %, or alternatively from about 85 wt. % to about 98 wt. %.

In some embodiments, the stoichiometry of the reactants in the condensation reaction for formation of the CATPs is adjusted so as to create a "partial amide" intermediate product. The partial amide may be characterized by a mole ratio of the reactive acid sites to amine sites of about 0.6:1, alternatively from about 0.5:1 to about 0.75:1, or alternatively from about 0.55:1 to about 0.65:1. The CATPs may be formed from the partial amide intermediate using any suitable methodology. For example, the remaining amine sites of the partial amide may be further reacted with an acid anhydride or polycarboxylic acid to produce the CATP. These reactions are depicted in Schemes I and II.

Referring to Scheme I, a tall oil fatty acid (TOFA) is reacted with diethylenetriamine (DETA) in a molar ratio of DETA to TOFA of 1:2, and the reaction product is further reacted with maleic anhydride, to form a two thirds amide (⅔ amide) mixture. Tall oil is a product made from acid treatment of alkaline liquors obtained from the manufacturing of wood pulp.

Scheme I

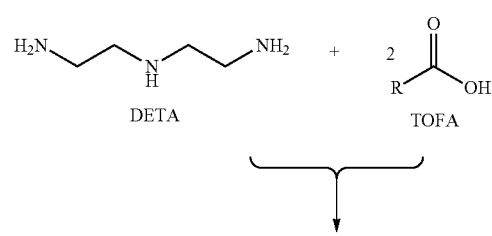

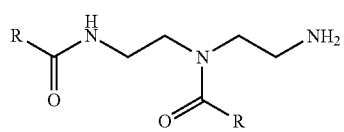

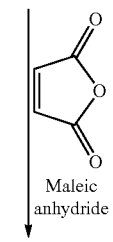

Maleic anhydride

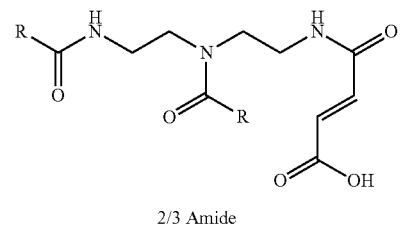

2/3 Amide

Referring to Scheme II, a tall oil fatty acid (TOFA) is reacted with diethylenetriamine (DETA) in a molar ratio of DETA to TOFA of 1:1.5, and the reaction products are further reacted with maleic anhydride, to form a half-amide (½ amide) mixture.

Scheme II

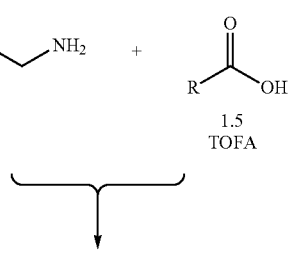

-continued

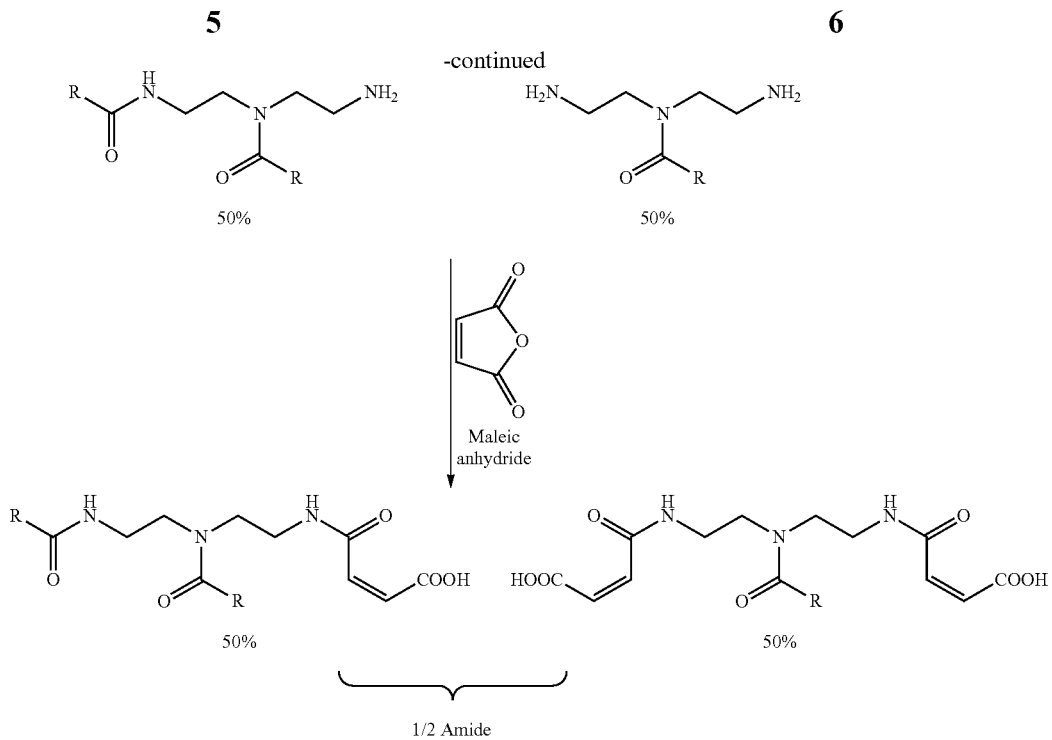

In an embodiment, the emulsifier comprises the reaction product of a Diels-Alder reaction of dienophiles with an acid mixture. The reaction product of the Diels-Alder reaction of dienophiles with an acid mixture is hereinafter designated a DARM. In an embodiment, the acid mixture comprises fatty acids and resin acids derived from the distillation of crude tall oil. The fatty acids found in tall oil are typically long chain monocarboxylic acids such as oleic, linoleic, myristic, linolenic, stearic and palmatic acid. Resin acids refer to a mixture of organic acids derived from the oxidation and polymerization reactions of terpenes and include compounds such as abietic acid, abietic acid derivatives and pimaric acid. The ratio of fatty acids to resin acids in the acid mixture may range from about 4:1 to about 1:1, alternatively from about 3:1 to about 1:1, or alternatively from about 2.5:1 to about 1.5:1. In an embodiment, the dienophile comprises carboxylic acids, polycarboxylic acids, anhydrides, or combinations thereof. The reaction of the dienophiles with the acid mixture (i.e., fatty acids and resin acids) results in a mixture of reaction products containing the DARM. In an embodiment, the amount of the DARM present in the mixture of reaction products is from about 50 wt. % to about 100 wt. %, alternatively from about 70 wt. % to about 98 wt. %, or alternatively from about 85 wt. % to about 97 wt. % based on the total weight of the reaction products.

In an embodiment, the emulsifier is a blend of a CATP and a DARM. The CATP and DARM may be combined using any suitable methodology, e.g., blending, mixing to form an emulsifier. In such embodiments, the ratio of the CATP to the DARM may range from about 1:5 to about 1:1, alternatively from about 1:4 to about 1:1, or alternatively from about 1:3 to about 1:2. In an embodiment, the quantity of the DARM will exceed the quantity of the CATP.

In an embodiment, the emulsifier (comprising a CATP, a DARM or both) may be further reacted with one or more cations to form soaps. Non-limiting examples of cations suitable for use in the saponification reaction include calcium cations, sodium cations, magnesium cations In an embodiment, the emulsifiers (i.e., CATP, DARM, or both) are reacted with calcium cations which are provided by any suitable source such as by contacting the emulsifier with lime, quicklime, calcium chloride, or combinations thereof.

In an embodiment, the emulsifier comprises one or more components of EZ MUL NT emulsifier; LE SUPERMUL emulsifier; or combinations thereof. EZ MUL NT emulsifier is an invert emulsifier and oil-wetting agent for mineral oil and paraffin based drilling fluid systems, and LE SUPERMUL emulsifier is an invert emulsifier and oil-wetting agent for synthetic based drilling fluid systems both of which are commercially available from Halliburton Energy Services, Inc. Additional examples of emulsifiers suitable for use in the present disclosure are described in U.S. Pat. Nos. 6,620,770; 7,008,907; 7,271,132; 7,432,230; and 7,534,746; each of which is incorporated by reference herein in its entirety.

In an embodiment an emulsifier of the type disclosed herein (e.g., CATP, DARM, or both) may be present within the EC in an amount of from about 25 wt. % to about 100 wt. %, alternatively from about 40 wt. % to about 80 wt. %, alternatively from about 30 wt. % to about 65 wt. %, or alternatively from about 45 wt. % to about 65 wt. % based on the total weight of the EC.

In an embodiment, the EC comprises a diluent. A diluent may be included in an EC of the type described herein with the purpose of diluting and/or modifying one or more physical properties of the composition (e.g., modifying the pour point of the composition).

In an embodiment, the diluent generally comprises any suitable oil. Nonlimiting examples of a diluent suitable for use in the present disclosure include petroleum oils, natural oils, synthetically-derived oils, diesel oil, kerosene oil, mineral oil, olefins and polyolefins (e.g., alpha-olefins and/or internal olefins), polydiorganosiloxanes, esters, biodiesel, diesters of carbonic acid, paraffins, ethers, or combinations thereof.

In an embodiment a diluent of the type disclosed herein may be present within the EC in an amount of from about 15 wt. % to about 90 wt. %, alternatively from about 20 wt. % to about 75 wt. %, or alternatively from about 25 wt. % to about 70 wt. % based on the total weight of the EC.

In an embodiment, the EC comprises a thinner (i.e., thinning agent). A thinner may be added to an EC of the type described herein with the purpose of modifying one or more physical properties of the EC (e.g., modifying the pour point of the composition). Without wishing to be limited by theory, the thinner may function to alter the physical properties of the mixture by contributing to breaking up intermolecular forces between the compounds of the mixture. In an embodiment, the thinner functions to adjust the viscosity of the EC to some user and/or process desired range. In an embodiment, the thinner comprises an alcohol, a fatty acid amide, or combinations thereof.

In an embodiment, the thinner comprises 2-methyl-1-propanol (i.e., isobutyl alcohol), 2-methyl-2-butanol (i.e., tert-amyl alcohol) or combinations thereof. In an embodiment, the thinner comprises 2-methyl-1-propanol (i.e., isobutyl alcohol) which is depicted in Structure 1.

Structure 1

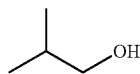

2-methyl-1-propanol is an organic compound with the formula $(CH_3)_2CHCH_2OH$. Isomers of 2-methyl-1-propanol include n-butanol, 2-butanol, and tert-butanol. 2-methyl-1-propanol can be produced by the carbonylation of propylene or naturally during the fermentation of carbohydrates.

In an embodiment the thinner comprises 2-methyl-2-butanol (i.e., tert-amyl alcohol) which is depicted in Structure 2.

Structure 2

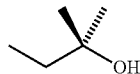

2-Methyl-2-butanol, tert-amyl alcohol, 2M2B or amylene hydrate, is one of the isomers of amyl alcohol. It is a clear, colorless liquid with a strong odor of peppermint or camphor.

In an embodiment, the thinner comprises a fatty acid amide. The fatty acid amide may be the product of a reaction between a fatty acid such as oleic acid or linoleic acid, and a primary or secondary amine such as diethanol amine, dimethylamine, diethylamine, methylamine, ethylamine, piperidine, aniline, or combinations thereof.

In another embodiment, the fatty acid amide comprises the product of a transamidification reaction between an amine and a fatty acid ester. The fatty acid ester may be a simple ester, such as the methyl or ethyl ester of the fatty acid or it may be a naturally occurring ester, such as a triglyceride. For example, the fatty acid ester in the transamidification reaction may comprise soya oil, sunflower oil, corn oil, safflower oil, or combinations thereof. In such an embodiment, the fatty acid amide may be the product of about 1:1 molar ratio of the fatty acid ester and the amine, alternatively about 1:1.5 molar ratio, or alternatively about 1:3 molar ratio. In an embodiment, the thinner comprises a fatty dimethyl amide.

As may be appreciated by one of skill in the art viewing this disclosure, the product resulting from the above-noted transamidification reaction between fatty acid esters (e.g., mixed fatty acid esters) and amines may be a complex mixture. For example, the resulting product may comprise a mixture of compounds including amides, amines, alkyl acids, and other side products. It is contemplated that the resulting product may be used in an EC of the type disclosed herein without further purification. Alternatively, the resulting product may be subjected to one or more suitable methodologies for purifying or increasing the utility of the product in an EC of the type disclosed herein.

In an embodiment, the thinner comprises STEPOSOL M-8-10 and STEPOSOL M-10, which are both formulations of N,N-dimethylcapramide commercially available from Stepan.

In an embodiment a thinner of the type disclosed herein may be present within the EC in an amount of from about 0.1 wt. % to about 40 wt. %, alternatively from about 1.0 wt. % to about 20 wt. %, or alternatively from about 1.5 wt. % to about 10 wt. %, based on the total weight of the EC.

In an embodiment, an EC of the type disclosed herein is characterized by a pour point of from about 100° F. to about −20° F., alternatively from about 40° F. to about −10° F., or alternatively from about 32° F. to about 0° F. The pour point herein refers to the lowest temperature at which a liquid retains its flow characteristics. The pour point of the EC is a qualitative test and may be determined by allowing the EC to equilibrate at a certain temperature, and then observing whether it is possible to pour the EC out of its container.

In an embodiment, the EC has a viscosity of from about 100 centipoise (cp) to about 1000000 cp, alternatively from about 200 cp to about 50000 cp, alternatively from about 250 cp to about 10000 cp, or alternatively from about 500 cp to about 10000 cp as determined by Anton Paar rheometer (Physica MCR 501).

In an embodiment, the EC may be used in a WSF at temperatures of from about 40° F. to about 550° F., alternatively from about 80° F. to about 350° F., or alternatively from about 100° F. to about 300° F.

The wellbore servicing fluid (WSF) may contain any amount of the EC effective for the intended wellbore service. In an embodiment, the EC is present in a WSF in an amount of from about 0.1 lb/bbl to about 40 lb/bbl, alternatively from about 2 lb/bbl to about 30 lb/bbl, or alternatively from about 6 lb/bbl to about 20 lb/bbl based on the total weight of the WSF.

In an embodiment, the EC comprises an emulsifier, a diluent, and a thinner. For example, the EC may comprise 65 wt. % emulsifier, 25 wt. % mineral oil, and 10 wt. % isobutyl alcohol based on the total weight of the EC. In such embodiments, the emulsifier is a CATP prepared according to the two third amide synthesis depicted in Scheme I. Such an EC may be used in a WSF comprising an oil-in-water emulsion or a water-in-oil emulsion to aid in stabilization of the WSF.

In an embodiment, the EC comprises 50 wt. % emulsifier, 41 wt. % diesel oil, and 9 wt. % tert-amyl alcohol based on the total weight of the EC. In such embodiments, the emulsifier is a CATP according to the half-amide synthesis depicted in Scheme II. Such an EC may be used in a WSF comprising an oil-in-water emulsion or a water-in-oil emulsion to aid in stabilization of the WSF.

In an embodiment, a method of servicing a wellbore comprises drilling a wellbore in a subterranean formation and introducing to the formation a wellbore servicing fluid (WSF), and specifically a WSF comprising an EC as disclosed herein. As used herein, a "servicing fluid" refers to a fluid used to drill, complete, work over, fracture, repair, prepare in any way a wellbore for the recovery of materials residing in a subterranean formation penetrated by the wellbore, or recovering of such materials. The servicing fluid is for use in a wellbore that penetrates a subterranean formation.

It is to be understood that "subterranean formation" encompasses both areas below exposed earth and areas below earth covered by water such as ocean or fresh water.

In an embodiment, the WSF comprises an EC. In an embodiment, the components of the EC are combined at the well site along with the remaining components of the WSF (e.g., an aqueous fluid, an oleaginous fluid, etc.); alternatively, the components of the EC are combined off-site (that is, the EC is formed as an additive package prior to arriving at the well site) and the EC is transported to and used at the well site (combined with the remaining components of the WSF such as an aqueous fluid, an oleaginous fluid, etc.).

Examples of wellbore servicing fluids include, but are not limited to, cement slurries, drilling fluids or muds, spacer fluids, lost circulation fluids, fracturing fluids, wettability alteration fluids or completion fluids. In an embodiment, the WSF comprises an oil-based servicing and/or drilling fluid or an aqueous based servicing and/or drilling fluid that comprises at least one oleaginous component. Nonlimiting examples of oil-based fluids suitable for use in the present disclosure include oil-based drilling or servicing fluids, invert emulsions and servicing fluids comprising substantially no aqueous component.

In an embodiment, an EC of the type disclosed herein can be introduced to a wellbore servicing fluid and function as an emulsifier. In an embodiment, the wellbore servicing fluid is an oil-based wellbore servicing fluid. As used herein, an oil-based wellbore servicing fluid includes fluids that are comprised entirely or substantially of non-aqueous fluids and/or invert emulsions wherein the continuous phase is a non-aqueous fluid. In an embodiment, the oil-based wellbore servicing fluid comprises less than about 35%, 25%, 20%, 15%, 10% or 1% water by weight of the wellbore servicing fluid. Alternatively, the wellbore servicing fluid may contain a balance of the non-aqueous fluid after taking other components of the fluid composition into account.

In an embodiment the wellbore servicing fluid comprises an oleaginous fluid. Examples of oleaginous fluids suitable for use in the present disclosure include, but are not limited to petroleum oils, natural oils, synthetically-derived oils, or combinations thereof. Nonlimiting examples of oleaginous fluids suitable for use in the present disclosure include diesel oil, fuel oil, kerosene oil, mixtures of crude oil, mineral oil, synthetic oil, vegetable oils, olefins, polyolefins, alpha-olefins, internal olefins, polydiorganosiloxanes, acetals, esters, diesters of carbonic acid, linear or branched paraffins, or combinations thereof.

Commercial examples of oleaginous fluids suitable for use in this disclosure include without limitation PETROFREE base fluid, which is a synthetic 100% ester base fluid and, XP-07 synthetic paraffin base fluid, which is a pure normal alkane mixture, both of which are available from Halliburton Energy Services, Inc; SHELL SARALINE 185V which is a synthetic drilling base fluid commercially available from Shell; EDC 99-DW which is a hydrocarbon commercially available from TOTAL Petrochemicals; ESCAID 110 hydrocarbon fluid is a petroleum distillate commercially available from EXXON-MOBIL Corp; and BAROID ALKANE paraffin-based synthetic fluid which is a base oil commercially available from Halliburton Energy Services, Inc.

In an embodiment, the wellbore servicing fluid comprises a water-in-oil emulsion fluid, termed an invert emulsion, comprising an oleaginous fluid and a non-oleaginous fluid (e.g., water), and further comprises an EC of the type disclosed herein.

In an embodiment, the oleaginous fluid of the invert emulsion may be of the type previously disclosed herein. The concentration of the oleaginous fluid in the emulsion should be sufficient so that an invert emulsion forms and may be less than about 99 volume percent (vol. %) based on the total volume of fluid the invert emulsion. In an embodiment, the amount of oleaginous fluid is from about 30 vol. % to about 95 vol. %, alternatively from about 40 vol. % to about 90 vol. %, or alternatively from about 50 vol. % to about 85 vol. % based on the total volume of fluid the invert emulsion.

In an embodiment, the non-oleaginous fluid component of the invert emulsion may generally comprise any suitable aqueous liquid. Examples of suitable non-oleaginous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride, potassium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate.

In an embodiment, the non-oleaginous fluid may be present in an amount that is less than the theoretical limit needed for forming an invert emulsion. In an embodiment, the non-oleaginous fluid may be present in an amount of less than about 70 volume percent (vol. %) based on the total volume of the invert emulsion, alternatively from about 1 vol. % to about 70 vol. %, or alternatively from about 5 vol. % to about 60 vol. %.

For example, in an embodiment, the invert emulsion may comprise from about 20 vol. % to about 60 vol. % non-oleaginous fluid based on the total volume of the invert emulsion and about 40 vol. % to 80 vol. % oleaginous fluid by volume, alternatively, from about 30 vol. % to about 50 vol. % or from about 50 vol. % to 70 vol. %.

In an embodiment, the EC may be utilized in a WSF suitable for use in a drilling operation. In such embodiments, the wellbore servicing fluid may be an invert emulsion, oil-based drilling mud comprising the EC.

In an embodiment, a WSF comprising an EC of the type described herein may be used during an enhanced oil recovery operation (EOR). EOR is a generic term for techniques for increasing the amount of crude oil that can be extracted from a hydrocarbon-producing formation (e.g., hydrocarbon reservoirs). EOR is achieved by gas injection, foam injection, chemical injection, microbial injection, or thermal recovery (which includes cyclic or continuous steam, steam flooding, and fire flooding).

In an embodiment, the EOR operation comprises chemical injection. ECs of the type disclosed herein can be used as a surfactant in an alkali surfactant polymer (ASP) flood. Chemicals used in EOR applications are dissolved in the formation brine or water from an available aquifer. Precipitation of surfactant in high saline water has been considered as one of the major problems associated with the ASP flooding. The ECs of this disclosure may display high solubility with high salinity brines (e.g., greater than about 300,000 ppm salt). ECs of the type disclosed herein when introduced into the injection water may reduce the oil water interfacial tension (IFT). Also the EC can alter the wettability of the reservoir rock. Reduction of IFT and wettability alteration can increase the oil recovery by mobilizing residual oil.

In an embodiment, the EOR occurs in a two well configuration, i.e., an injector well and a producer well. For example, a WSF comprising an EC may be pumped into the formation via the injector well. The WSF comprising the EC may be allowed to sweep across the formation, by flowing through oil-containing zones that connect the injector well to the producer well.

In an embodiment, the EC, a WSF comprising the EC, and methods of using same disclosed herein may be advantageously employed in the performance of one or more wellbore servicing operations. In an embodiment, the EC may be advantageously employed in high salinity environments, for example high salinity WSFs and/or downhole environments having high salinity (that may in turn yield increased salinity is WSFs employed therein). In an embodiment, an EC is employed in a WSF comprising saturated brines. For example, the EC may be employed in WSF having salt concentrations ranging from about 0 ppm to about 500,000 ppm, alternatively from about 1000 ppm to about 300,000 ppm, or alternatively from about 50,000 ppm to about 150,000 ppm.

An EC of the type disclosed herein may facilitate the formation of stable WSF emulsions having an electrical stability ranging from about 0 to about 2000 Volts (V), alternatively from about 100 V to about 1500 V, or alternatively from about 100 V to about 1000 V as described in API Recommended Practice 13B-2. Additionally, in an embodiment, the EC may be environmentally acceptable, and display a low toxicity level.

The following are additional enumerated embodiments of the concepts disclosed herein.

A first embodiment which is a method of servicing a wellbore in a subterranean formation comprising preparing an invert emulsion comprising an aqueous fluid, an oleaginous fluid, and an emulsifier composition (EC), wherein the emulsifier composition comprises an emulsifier, a diluent, and a thinner, wherein the thinner comprises an alcohol, a fatty acid amide, or combinations thereof; and placing the invert emulsion in the wellbore.

A second embodiment which is the method of the first embodiment wherein the emulsifier comprises a carboxylic acid-terminated polyamide, a mixture produced by a Diels-Alder reaction of dienophiles with a mixture of fatty acids and/or resin acids, or combinations thereof.

A third embodiment which is the method of the second embodiment wherein the carboxylic acid-terminated polyamide comprises one or more products of a condensation reaction between fatty acids and polyamines.

A fourth embodiment which is the method of any of the second and third embodiments wherein the dienophile comprises carboxylic acids, polycarboxylic acids, anhydrides, or combinations thereof.

A fifth embodiment which is the method of any of the second through fourth embodiments wherein the fatty acids and/or resin acids are derived from the distillation of crude tall oil.

A sixth embodiment which is the method of any of the first through fifth embodiments wherein the emulsifier is present in the EC in an amount of from about 25 wt. % to about 100 wt. %, based on the total weight of the EC.

A seventh embodiment which is the method of any of the first through sixth embodiments wherein the diluent comprises petroleum oils, natural oils, synthetically-derived oils, diesel oil, kerosene oil, mineral oil, olefins and polyolefins (e.g., alpha-olefins and/or internal olefins), polydiorganosiloxanes, esters, biodiesel, diesters of carbonic acid, paraffins, ethers, or combinations thereof.

An eighth embodiment which is the method of any of the first through seventh embodiments wherein the diluent is present in the EC in an amount of from about 15 wt. % to about 90 wt. %, based on the total weight of the EC.

A ninth embodiment which is the method of any of the first through eighth embodiments wherein the alcohol comprises 2-methyl-1-propanol, 2-methyl-2-butanol or combinations thereof.

A tenth embodiment which is the method of any of the first through ninth embodiments wherein the fatty acid amide comprises the product of a reaction between a polyamine and a fatty acid or a fatty acid ester or combinations thereof.

An eleventh embodiment which is the method of the tenth embodiment wherein the amine comprises diethanol amine, dimethylamine, diethylamine, methylamine, ethylamine, piperidine, aniline, or combinations thereof.

A twelfth embodiment which is the method of any of the tenth and eleventh embodiments wherein the fatty acid comprises oleic acid, linoleic acid, abietic acid, abietic acid derivatives, pimaric acid, plamitic, myristic, linolenic, stearic, or combinations thereof.

A thirteenth embodiment which is the method of any of the tenth through twelfth embodiments wherein the fatty acid ester comprises a methyl fatty acid ester, an ethyl fatty acid ester, a naturally occurring ester, a triglyceride, soya oil, sunflower oil, corn oil, safflower oil, or combinations thereof.

A fourteenth embodiment which is the method of any of the tenth through thirteenth embodiments wherein the fatty acid ester comprises a fatty dimethyl amide.

A fifteenth embodiment which is the method of any of the first through fourteenth embodiments wherein the thinner is present in the EC in an amount of from about 0.1 wt. % to about 40 wt. %, based on the total weight of the EC.

A sixteenth embodiment which is the method of any of the first through fifteenth embodiments wherein the wellbore servicing fluid comprises an oil-based drilling mud.

A seventeenth embodiment which is the method of any of the first through sixteenth embodiments wherein the EC has a pour point of from about −20° F. to about 100° F.

An eighteenth embodiment which is the method of any of the first through seventeenth embodiments wherein the EC has an electrical stability of from about 0 to about 2000 V.

A nineteenth embodiment which is the method of any of the first through eighteenth embodiments wherein the EC has a viscosity of from about 100 cp to about 100000 cp.

A twentieth embodiment which is a A method of servicing a wellbore in a subterranean formation comprising flowing a wellbore serving fluid comprising an emulsifier composition (EC) through a portion of a subterranean formation, wherein the EC comprises an emulsifier, a diluent and a thinner and wherein the thinner comprises 2-methyl-1-propanol, 2-methyl-2-butanol, a fatty acid amide, or combinations thereof; contacting the EC with oil in situ within the formation to form an emulsion; an reducing the water-oil interfacial tension and altering the wettability to provide enhanced oil recovery from the formation.

A twenty-first embodiment which is the method of the twentieth embodiment wherein the emulsifier comprises a partial amide.

A twenty-second embodiment which is the invert emulsion wellbore servicing fluid comprising an aqueous fluid, an oleaginous fluid, and an emulsifier composition (EC), wherein the emulsifier composition comprises an emulsifier, a diluent, and a thinner, wherein the thinner comprises an alcohol, a fatty acid amide, or combinations thereof.

A twenty-third embodiment which is the invert emulsion of the twenty-second embodiment formulated as a drilling fluid.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Six samples, designated samples 1-6, were prepared containing an emulsifier, a diluent, and a thinner. Three thinning agents were used: isobutyl alcohol (IBA), tertiary amyl alcohol (t-AA) and butyl blend (BB, 1:1 mixture of ethylene glycol-monobutyl ether and diethylene glycol butyl ether). In all cases the diluent was mineral oil and the emulsifier was a two-thirds amide. The composition of each sample and the amounts of each component present in the sample are presented in Table 1 as the weight percent of material based on the total weight of the sample. The samples were formulated to provide a composition having a pour point of 0° F.

TABLE 1

| Sample Number | Thinner | Emulsifier (wt.%) | Thinner (wt.%) | Diluent (wt.%) |
|---|---|---|---|---|
| 1 | IBA | 65 | 9 | 26 |
| 2 | t-AA | 65 | 9 | 26 |
| 3 | BB | 65 | 9 | 26 |
| 4 | IBA | 40 | 1 | 59 |
| 5 | t-AA | 40 | 1 | 59 |
| 6 | BB | 40 | 3 | 57 |

The data displayed in Table 1 indicates that when the compositions were formulated by having a 65 wt. % emulsifier (i.e., two-thirds amide), all compositions required the same amount of diluent, i.e., 26 wt. %, and also the same amount of thinner, i.e., 9 wt. %. However, the composition that utilized BB as the thinner was notably much thicker. This results also demonstrate that when the samples were formulated to have 40 wt. % of the two-thirds amide emulsifier, to achieve a pour point of 0° F., the compositions required 59 wt. % of diluent however only 1 wt. % of thinners of the type disclosed herein (i.e., IBA and t-AA) were needed. In contrast, when BB was used as a thinner, the amount of thinner required to achieve a 0° F. pour point was 3 wt. %, more than twice the amount required for either IBA or t-AA.

Similar results were obtained when the emulsifier was a half-amide, Table 2. Referring to Table 2, six samples designated samples 7 to 12 were prepared containing the half-amide emulsifier, mineral oil as the diluent and the indicated thinner present in the weight percentages indicated which are based on the total weight of the sample.

TABLE 2

| Sample | Thinner | Emulsifier (wt.%) | Thinner (wt.%) | Diluent (wt.%) |
|---|---|---|---|---|
| 7 | IBA | 50 | 10 | 40 |
| 8 | t-AA | 50 | 10 | 40 |
| 9 | BB | 50 | 10 | 40 |
| 10 | IBA | 30 | 1.5 | 68.5 |
| 11 | t-AA | 30 | 1.5 | 68.5 |
| 12 | BB | 30 | 2.5 | 67.5 |

The data displayed in Table 2 indicates that when the samples contained 50 wt. % of the half-amide emulsifier, each sample required 40 wt. % diluent and 10 wt. % thinner to achieve a pour point of 0° F. However, the composition that utilized BB as the thinner was notably thicker. The results also demonstrate that when the samples contained 30 wt. % half-amide emulsifier each sample required 68.5 wt. % diluent. However samples 10 and 11 which contained IBA and t-AA respectively only required 1.5 wt. % to provide a pour point of 0° F. In contrast, when BB was used as a thinner, Sample 12, the amount of thinner required to achieve a 0° F. pour point was considerably higher, 2.5 wt. %.

For a two-third amide emulsifier, the effect of the type of fatty acid amide thinner on the pour point was investigated and the data is presented in Table 3. Referring to Table 3, each of samples 13-16 contained a two-third amide emulsifier, mineral oil as the diluent and the indicated thinner in the amounts indicated in the Table 3.

TABLE 3

| Sample No. | Thinner | Emulsifier (wt.%) | Thinner (wt.%) | Diluent (wt.%) |
|---|---|---|---|---|
| 13 | STEPOSOL M-8-10 | 65 | 20 | 5 |
| 14 | STEPOSOL M-10 | 65 | 20 | 5 |
| 15 | STEPOSOL M-8-10 | 40 | 10 | 50 |
| 16 | STEPOSOL M-10 | 40 | 10 | 50 |

Referring to the data in Table 3, for the samples containing 65 wt. % of the two-thirds amide emulsifier, 5 wt. % diluent and 20 wt. % thinner was required to observe a pour point of ° F. For the samples containing 40 wt. % of the two-thirds amide emulsifier, 50 wt. % of the mineral oil diluent and 10 wt. % of the thinner was required to observe a pour point of ° F.

Example 2

The stability of emulsions comprising ECs of the type disclosed herein were investigated by stress-testing emulsions under shear. More specifically, six samples, designated samples A-E, were prepared. Samples A, B, and C contained diesel oil as the base oil, a two-thirds emulsifier and IBA, t-AA, and BB respectively. Sampled D, E, and F contained mineral oil as the base oil, a two-thirds emulsifier and IBA, t-AA, and BB respectively. Each sample also contained a calcium chloride brine and viscosifier. The amounts of each component utilized are presented in Table 4. GELTONE II viscosifier is an organophilic clay commercially available from Halliburton Energy Services.

TABLE 4

| Component | Units | Amount |
|---|---|---|
| Base Oil | Bbl | 0.6097 |
| Active Emulsifier (65%) | Lb | 1.3 |
| CaCl$_2$ Brine | Bbl | 0.1197 |
| GELTONE II viscosifier | Lb | 3 |
| Salinity of Brine | ppm | 300,000 |
| Oil to Water Ratio (volumetric) | | 85/15 |
| Density | lb/gal | 15 |

Figure 2:
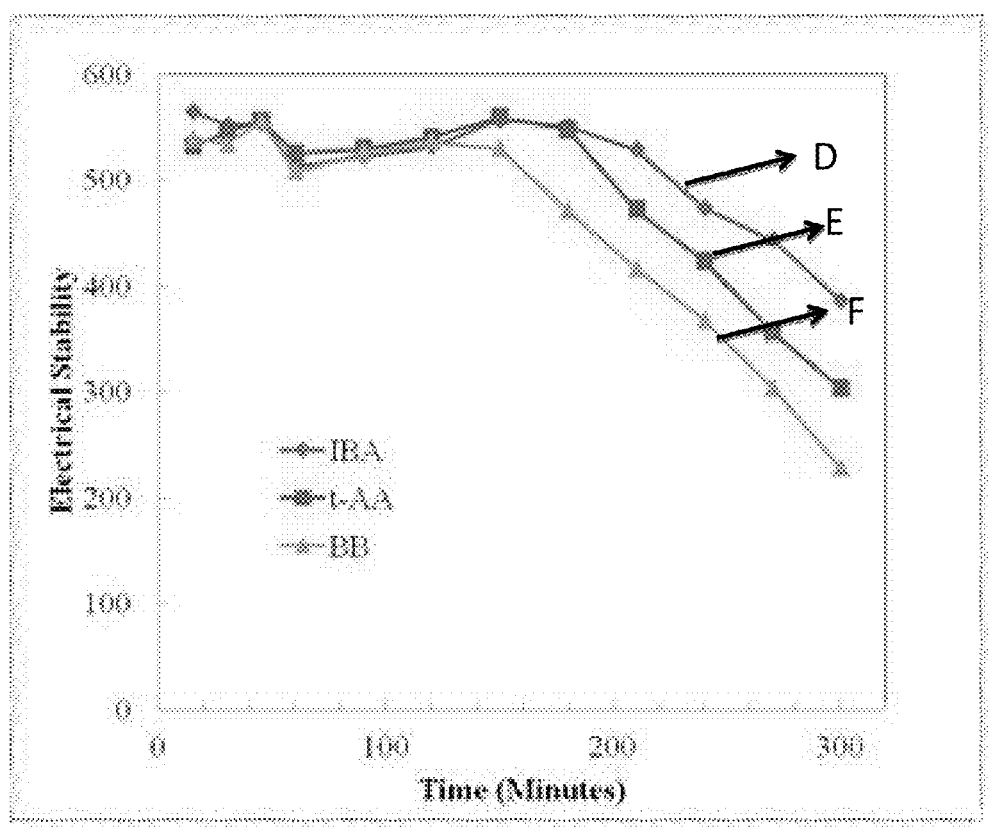

The samples were run on a Multi-mixer with periodic measurement of electrical stability. The electrical stability of each sample as a function of time with shear was determined by ES (electric stability) meter in accordance with the procedures described in API Recommended Practice 13B-2, and the results are plotted in FIGS. 1 and 2 for diesel and mineral oil as the base oil, respectively. In an electrical stability test, an emulsion is present if the electrical stability is greater than zero. A stable emulsion is indicated by a high value of electrical stability that can be sustained over time. For both Diesel oil (FIG. 1) and mineral oil (FIG. 2), samples containing IBA, i.e., Samples A and D, had a higher stability than samples containing t-AA, i.e., Samples B and E which in turn was higher than samples containing BB, i.e., Samples C and F. Further, the samples containing mineral oil, i.e., Samples D-F, had higher electrical stability values over longer time periods when compared to the samples containing diesel, i.e., Samples A-C.

The exemplary EC disclosed herein may directly or indirectly affect one or more components or pieces of equipment associated with the preparation, delivery, recapture, recycling, reuse, and/or disposal of the disclosed EC. For example, the disclosed EC may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary EC. The disclosed EC may also directly or indirectly affect any transport or delivery equipment used to convey the EC to a well site or downhole such as, for example, any transport vessels, conduits, pipelines, trucks, tubulars, and/or pipes used to fluidically move the EC from one location to another, any pumps, compressors, or motors (e.g., topside or downhole) used to drive the EC into motion, any valves or related joints used to regulate the pressure or flow rate of the EC, and any sensors (i.e., pressure and temperature), gauges, and/or combinations thereof, and the like. The disclosed EC may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
preparing an invert emulsion comprising an aqueous fluid, an oleaginous fluid, and an emulsifier composition (EC), wherein the emulsifier composition comprises (a) an emulsifier in an amount of from about 25 wt. % to about 100 wt. %, based on the total weight of the EC, (b) a diluent wherein the diluent is present in the EC in an amount of from about 15 wt. % to about 90 wt. % based on the total weight of the EC, and (c) a thinner, wherein the thinner comprises an alcohol, a fatty acid amide, or combinations thereof, and wherein the fatty acid amide comprises the product of a reaction between (i) an amine comprising diethanol amine, dimethylamine, diethylamine, methylamine, ethylamine, piperidine, aniline, or combinations thereof and (ii) a fatty acid or a fatty acid ester or combinations thereof; and
placing the invert emulsion in the wellbore.

2. The method of claim 1 wherein the emulsifier comprises a carboxylic acid-terminated polyamide, a mixture produced by a Diels-Alder reaction of dienophiles with a mixture of fatty acids and/or resin acids, or combinations thereof.

3. The method of claim 2 wherein the carboxylic acid-terminated polyamide comprises one or more products of a condensation reaction between fatty acids and polyamines.

4. The method of claim 2 wherein the dienophile comprises carboxylic acids, polycarboxylic acids, anhydrides, or combinations thereof.

5. The method of claim 2 wherein the fatty acids and/or resin acids are derived from the distillation of crude tall oil.

6. The method of claim 1 wherein the diluent comprises petroleum oils, natural oils, synthetically-derived oils, diesel oil, kerosene oil, mineral oil, olefins and polyolefins, polydiorganosiloxanes, esters, biodiesel, diesters of carbonic acid, paraffins, ethers, or combinations thereof.

7. The method of claim 1 wherein the fatty acid comprises oleic acid, linoleic acid, abietic acid, abietic acid derivatives, pimaric acid, plamitic, myristic, linolenic, stearic, or combinations thereof.

8. The method of claim 1 wherein the fatty acid ester comprises a methyl fatty acid ester, an ethyl fatty acid ester, a naturally occurring ester, a triglyceride, soya oil, sunflower oil, corn oil, safflower oil, or combinations thereof.

9. The method of claim 1 wherein the fatty acid amide comprises a fatty dimethyl amide.

10. The method of claim 1 wherein the thinner is present in the EC in an amount of from about 0.1 wt. % to about 40 wt. %, based on the total weight of the EC.

11. The method of claim 1 wherein the wellbore servicing fluid comprises an oil-based drilling mud.

12. The method of claim 1 wherein the EC has a pour point of from about −20° F. to about 100° F.

13. The method of claim 1 wherein the EC has an electrical stability of from about 0 to about 2000 V.

14. The method of claim 1 wherein the EC has a viscosity of from about 100 cp to about 100000 cp.

15. A method of servicing a wellbore in a subterranean formation comprising:

flowing a wellbore serving fluid comprising an emulsifier composition (EC) through a portion of a subterranean formation, wherein the EC comprises an emulsifier, a diluent wherein the diluent is present in the EC in an amount of from about 15 wt. % to about 90 wt. %, based on the total weight of the EC and a thinner, wherein the thinner comprises 2-methyl-1-propanol, 2-methyl-2-butanol, a fatty acid amide, or combinations thereof;, and wherein the fatty acid amide comprises the product of a reaction between (i) an amine comprising diethanol amine, dimethylamine, diethylamine, methylamine, ethylamine, piperidine, aniline, or combinations thereof and (ii) a fatty acid or a fatty acid ester or combinations thereof;

contacting the EC with oil in situ within the formation to form an emulsion; and reducing the water-oil interfacial tension and altering the wettability to provide enhanced oil recovery from the formation.

16. The method of claim 15 wherein the emulsifier comprises a partial amide.

17. The method of claim 15 wherein the EC has a pour point of from about −20° F. to about 100° F.

18. The method of claim 15 wherein the EC has an electrical stability of from about 0 to about 2000 V.

19. The method of claim 15 wherein the EC has a viscosity of from about 100 cp to about 100000 cp.

20. The method of claim 15 wherein the servicing of the wellbore is an enhanced oil recovery operation.

* * * * *